(12) United States Patent
Huber et al.

(10) Patent No.: US 12,397,352 B2
(45) Date of Patent: Aug. 26, 2025

(54) COATER FOR A 3D PRINTER, 3D PRINTER HAVING THE COATER, USE OF THE COATER AND USE OF THE 3D PRINTER

(71) Applicant: ExOne GmbH, Gersthofen (DE)

(72) Inventors: Thomas Huber, Aichach (DE); Hadi Huleihil, Augsburg (DE); Alexander Müller, Diedorf-Vogelsang (DE); Roland Ladewig, Windeby (DE)

(73) Assignee: ExOne GmbH, Gersthofen (DE)

( * ) Notice: Subject to any disclaimer, the term of this patent is extended or adjusted under 35 U.S.C. 154(b) by 913 days.

(21) Appl. No.: 17/620,676

(22) PCT Filed: Jun. 18, 2020

(86) PCT No.: PCT/EP2020/066978
§ 371 (c)(1),
(2) Date: Dec. 18, 2021

(87) PCT Pub. No.: WO2020/254502
PCT Pub. Date: Dec. 24, 2020

(65) Prior Publication Data
US 2022/0281010 A1    Sep. 8, 2022

(30) Foreign Application Priority Data

Jun. 19, 2019   (EP) ................................. 19181266

(51) Int. Cl.
*B22F 12/53*      (2021.01)
*B22F 10/14*      (2021.01)
(Continued)

(52) U.S. Cl.
CPC ............. *B22F 12/53* (2021.01); *B22F 10/14* (2021.01); *B22F 12/224* (2021.01); *B22F 12/52* (2021.01);
(Continued)

(58) Field of Classification Search
CPC ........ B22F 12/53; B22F 10/14; B22F 12/224; B22F 12/52; B22F 12/57; B22F 12/67;
(Continued)

(56) References Cited

U.S. PATENT DOCUMENTS 5,665,401 A    9/1997  Serbin et al.
6,136,257 A *  10/2000 Graf ........................ B22F 3/004
                                                118/308
(Continued)

FOREIGN PATENT DOCUMENTS

CN    106457690 A    2/2017
CN    109153183 A    1/2019
(Continued)

OTHER PUBLICATIONS

Russian Search Report issued for the corresponding Russian patent application No. 19181266.8, dated Sep. 12, 2022, 2 pages (for informational purposes only).
(Continued)

*Primary Examiner* — Jessee R Roe
*Assistant Examiner* — Michael Aboagye
(74) *Attorney, Agent, or Firm* — Viering, Jentschura & Partner mbB

(57) ABSTRACT

Disclosed is a coater 10 for a 3D printer, comprising an elongated container 30 comprising two opposing long side walls 32, 34 between which an internal cavity 36 is formed for receiving particulate material, the cavity 36 opening into an elongated output slot 38 for outputting the particulate material from the container 30 onto a construction field, and a first adjusting device 50 configured to move the two long side walls 32, 34 relative to each other at least in a respective lower portion 32a, 34a thereof adjoining the output slot 38 to thereby variably adjust the width of the output slot 38.

17 Claims, 7 Drawing Sheets

(51) Int. Cl.
    *B22F 12/00* (2021.01)
    *B22F 12/52* (2021.01)
    *B22F 12/57* (2021.01)
    *B22F 12/67* (2021.01)
    *B33Y 30/00* (2015.01)
    *B33Y 40/00* (2020.01)

(52) U.S. Cl.
    CPC .............. *B22F 12/57* (2021.01); *B22F 12/67* (2021.01); *B33Y 30/00* (2014.12); *B33Y 40/00* (2014.12)

(58) Field of Classification Search
    CPC ..... B22F 2999/00; B33Y 30/00; B33Y 40/00; B33Y 50/02; B33Y 10/00; B29C 64/205; B29C 64/124; B29C 64/153; B29C 64/165; B29C 31/02; B29C 64/20; B29C 64/25
    USPC ........... 266/274; 118/308, 56, 303; 427/193, 427/212
    See application file for complete search history.

(56) References Cited

U.S. PATENT DOCUMENTS

| | | | | |
|---|---|---|---|---|
| 7,748,971 | B2* | 7/2010 | Hochsmann | B29C 41/36 425/375 |
| 8,951,033 | B2* | 2/2015 | Hochsmann | B29C 64/165 425/375 |
| 9,486,962 | B1 | 11/2016 | Dugan et al. | |
| 9,616,620 | B2* | 4/2017 | Hoechsmann | B29C 64/35 |
| 10,695,954 | B2* | 6/2020 | Höchsmann | B29C 64/236 |
| 11,077,611 | B2* | 8/2021 | Ederer | B29C 64/214 |
| 11,577,425 | B2* | 2/2023 | Muller | B29C 64/343 |
| 2006/0105102 | A1 | 5/2006 | Hochsmann et al. | |
| 2017/0182713 | A1 | 6/2017 | Toru et al. | |
| 2017/0341302 | A1 | 11/2017 | Höchsmann et al. | |
| 2017/0361500 | A1 | 12/2017 | Rainer et al. | |
| 2018/0043615 | A1 | 2/2018 | Rainer et al. | |
| 2018/0079133 | A1 | 3/2018 | Ederer et al. | |
| 2018/0169894 | A1 | 6/2018 | Hoechsmann et al. | |
| 2020/0189144 | A1 | 6/2020 | Muller et al. | |
| 2022/0281010 | A1 | 9/2022 | Huber et al. | |

FOREIGN PATENT DOCUMENTS

| | | |
|---|---|---|
| DE | 102009056689 A1 | 6/2011 |
| DE | 102014112469 A1 | 3/2016 |
| DE | 102015003372 A1 | 9/2016 |
| DE | 102015103726 A1 | 9/2016 |
| DE | 102017120205 A1 | 3/2019 |
| EP | 0739704 A1 | 10/1996 |
| EP | 0945202 A2 | 9/1999 |
| RU | 2640551 C1 | 1/2018 |
| WO | 03086726 A1 | 10/2003 |

OTHER PUBLICATIONS

Chinese Office Action of corresponding Chinese patent application No. 202080044423.7, dated Mar. 29, 2024, 7 pages (for informational purposes only).

Canadian Search Report issued for the corresponding CA patent application No. CA 3140998, dated Apr. 3, 2023, 5 pages (For informational purposes only).

International Search Report for International application No. PCT/EP2020/066978, mailed on Oct. 12, 2020, 4 pages (For informational purposes only).

* cited by examiner

COATER FOR A 3D PRINTER, 3D PRINTER HAVING THE COATER, USE OF THE COATER AND USE OF THE 3D PRINTER

The present invention relates to a coater for a 3D printer, a 3D printer having the coater, a use of the coater and a use of the 3D printer.

Various 3D printing processes (and consequently various types of 3D printers, i.e. machines/equipment for building up a component in layers) are known.

Some 3D printing processes have the following steps in common:
(1) First, particulate material (or particulate construction material) is applied over the entire surface of/continuously on a construction field, so as to form a layer of unsolidified particulate material.
(2) The applied layer of unsolidified particulate material is selectively solidified in a predetermined partial area (in accordance with a/the component to be manufactured), for example by selectively printing a (for example liquid) treatment agent, for example a binding agent, for example a binder.
(3) Steps (1) and (2) are repeated to manufacture a/the desired component. For this purpose, a construction platform on which the component is built up in layers may, for example, be lowered by respectively one layer thickness before a new layer is applied (alternatively, a/the coater and a/the printing device may, for example, be raised by respectively one layer thickness).
(4) Finally, the manufactured component which is formed by the solidified partial areas and is supported and surrounded by loose, unsolidified particulate material may be unpacked.

A/the construction space in which the component or the components is/are manufactured may, for example, be defined by a so-called construction box (also referred to as job box, for example formed as a so-called interchangeable container). A construction box of this type may have a circumferential wall structure which is open in an upward direction and extends in a vertical direction (for example formed by four vertical side walls), which may, for example, be formed to be rectangular when viewed from above. A height-adjustable construction platform may be received in the construction box. In this respect, the space above the construction platform and between the vertical circumferential wall structure may for example at least contribute to forming the construction space. An upper area of the construction space may, for example, be referred to as a construction field. However, the component may also, for example, be freely built up on a construction platform, in which case the construction space results from the layer composite on the construction platform and the construction field is defined by a topmost, most recently applied layer. In this respect, it is possible, for example, to also print a frame surrounding the perimeter of the construction space.

Building up one or more three-dimensional components in a/the construction space in layers may, for example, take place by selectively solidifying several adjacent particulate material layers in a respective partial area thereof, for example by binder jetting, i.e. by (selective) bonding of the particulate material with a (for example liquid) treatment agent, for example binding agent, for example binder.

In the above step (1), a coater (also referred to as a recoater) is usually used. Different coaters are known for use in a 3D printer, by means of which a particulate material can be applied in the form of a uniform, full-area/continuous layer to the construction field (also referred to as construction surface or construction area).

One type of coater uses a roller (a so-called roller coater), in front of which a quantity of particulate material is first deposited and which is then moved horizontally across the construction field to apply the particulate material to the construction field in the form of a uniform layer. The roller can be rotated in the opposite direction in this regard.

Another kind of coater (a so-called container coater, for example a slot coater) uses a container which defines an inner cavity for receiving particulate material, and has an (for example elongate) output slot (or output slit) for outputting the particulate material. The container coater may, for example, be movable across a/the construction field (for example horizontally, for example transverse to its longitudinal direction), wherein the particulate material can be output onto the construction field through the (for example elongate) output slot to thereby apply a uniform, full-area/continuous particulate material layer on the construction field and the construction platform, respectively. The coater may be elongate, for example, to span or to cover the length or width of a rectangular construction field.

In the above step (2), a printing device having a print head may for example be used, which applies a (for example liquid) treatment agent in a controlled way onto a partial area of a/the particulate material layer applied before (so-called binder jetting). The treatment agent contributes to a (direct and/or later) solidification of the particulate material layer in the partial area. For example, the treatment agent may be/contain a binding agent, for example binder, for example a binder component of a multicomponent binder.

Alternatively, a laser may, for example, be used in the above step (2) to solidify a partial area of the particulate material layer applied previously, in particular by sintering or melting the particulate material in the partial area.

The present invention relates to a coater of the second mentioned type, i.e. a container coater, for example slot coater. Examples of container coaters are known, for example, from DE 10 2009 056 689 A1, DE 10 2014 112 469 A1 and DE 10 2017 120 205 A1.

It may be considered an object of the present invention to provide an improved coater for a 3D printer.

Alternatively or in addition, it may be considered an object of the present invention to provide an alternative coater for a 3D printer.

Alternatively or in addition, it may be considered an object of the present invention to provide a coater for a 3D printer that enables improved reproducibility of the 3D printing process.

Alternatively or in addition, it may be considered an object of the present invention to provide a coater for a 3D printer that has improved operability.

Alternatively or in addition, it may be considered an object of the present invention to provide a coater for a 3D printer that enables effective and/or efficient application of particulate material to a construction field, for example even with changing formulations (taking into account, for example, one or more of the particulate material, any additives contained in the particulate material, any binder component contained in the particulate material, binder component to be printed, etc.).

Alternatively or in addition, it may be considered an object of the present invention to provide a coater for a 3D printer by means of which particulate material can be reliably applied to a construction field, for example also with changing formulations (taking into account, for example, one or more of the particulate material, any additives contained in the particulate material, any binder component contained in the particulate material, binder component to be printed, etc.).

According to an aspect of the invention, a coater (for example container coater, for example slot coater) for a 3D printer comprises an elongated (or oblong) container having two opposing, long side walls between which an internal cavity for receiving particulate material is formed, which opens into an oblong (or elongate) output slot (for example output slit) for outputting the particulate material from the container onto a construction field, and a first adjusting device configured to move the two long side walls relative to each other at least in a respective lower portion thereof adjoining the output slot to thereby variably adjust the width of the output slot (for example such that a quantity of particulate material discharged by the coater (onto the construction field) is variably adjustable). The coater may, for example, be displaceable across a/the construction field (for example horizontally, for example transverse to its longitudinal direction), wherein the particulate material can be discharged onto the construction field through the output slot, to thereby apply a uniform, full-area/continuous particulate material layer onto the construction field and a construction platform, respectively. The coater may, for example, be elongate or oblong, in order to span or cover the length or width of a rectangular construction field.

The first adjusting device may, for example, be configured and/or allow to adjust the slot width in a controlled and/or automated way. The first adjusting device may, for example, comprise one or more (for example electric) motors which in turn may, for example, be connected to a controller or may be controlled thereby.

By moving the two long side walls relative to each other at least in a respective lower portion thereof adjoining the output slot, for example, the width of the output slot can be variably adjusted in a simple manner. In particular, for example, a separate device for adjusting the width of the output slot can be omitted, for example, a separate arrangement of two slides which can be moved horizontally/linearly towards and away from each other.

This can, for example, simplify a structure of the coater. Furthermore, for example, an amount of particulate material discharged from the coater onto the construction field can be adjusted and/or metered and/or controlled in a simple manner and/or reliably.

For example, in order to move the two long side walls relative to each other at least in a respective lower portion thereof adjoining the output slot, (at least) a (movable) lower portion of one of the two long side walls adjoining the output slot may be movable (or be moved) in the direction of a (non-movable) lower portion of the other of the two long side walls adjoining the output slot. For example, for this purpose, a first (movable) one of the two long side walls may be movable (or be moved) completely in the direction of (at least a portion of) the second (non-movable) one of the two long side walls. Alternatively, for example, the (both) lower portions of the two long side walls adjoining the output slot may be movable (or be moved) (respectively) in the direction toward each other.

The inner cavity for receiving particulate material may, for example, be defined and/or formed by the container. The container may, for example, have a short side wall at each longitudinal end. The container may, for example, have two short side walls. The output slot may be located, for example, at a lower end of the container. For example, the output slot may be at least co-formed, for example formed, by the two lower ends (for example the two lower edges) of the two long side walls. For example, one (first) of the two long side walls may be (relatively) movable and the other (second) of the two long side walls may be non-(relatively) movable. For example, the two long side walls may be (relatively) movable. For example, a lower portion of one (first) of the two long side walls adjoining the output slot may be (relatively) movable and a lower portion of the other (second) of the two long side walls adjoining the output slot may be non-(relatively) movable. For example, the two lower portions of the two long side walls adjoining the output slot may be (respectively) (relatively) movable.

For example, the first adjusting device may be configured to pivot the two long side walls relative to each other at least in a respective lower portion thereof adjoining the output slot, to thereby variably adjust the width of the output slot. The width of the output slot may be variably adjustable or adjusted, for example, by a pivoting movement, for example by a pivoting movement of the lower portions of the two long side walls adjoining the output slot relative to each other. A/the pivot axis may, for example, be located outside the container (for example, outside the inner cavity). The pivot axis may, for example, be (substantially) parallel to a/the longitudinal axis of the container. For example, the pivot axis may be arranged in a vertical direction between the first adjusting device and the output slot. By means of a pivoting movement, for example, the width of the output slot can be variably adjustable or adjusted in a simple manner and/or reliably.

For example, the coater may have an elongated (or oblong) support structure to which the container and the first adjusting device are attached.

For example, a longitudinal axis of the support structure may be (substantially) parallel to a longitudinal axis of the container. For example, the container may be laterally connected to the support structure. For example, the first adjusting device may be attached directly to and/or on or at an upper side of the support structure. The long side wall facing away from the support structure of the coater ("outer side wall") may, for example, be indirectly attached to the support structure at least in a lower portion thereof, for example completely, via the first adjusting device. For example, the first adjusting device may be configured to move, for example pivot, the long side wall facing away from the support structure of the coater in at least the lower portion thereof adjoining the output slot. For example, at least a lower portion of the long side wall facing the support structure of the coater may be non-(relatively) movable (at least not movable for the purpose of adjusting the slot width, wherein for example movement is possible as a result of the optional wiping element, which may be formed as an oscillating blade). For example, (at least) a lower portion of the long side wall facing the support structure of the coater may be fixedly attached to the support structure and/or motion-decoupled from the (relative) motion of the outer side wall. The one of the two long side walls that is located further away from the support structure in a direction orthogonal to the longitudinal direction of the support structure is referred to as the long side wall (of the container) facing away from the support structure of the coater. By moving at least the lower portion of the long side wall facing away from the support structure of the coater, for example, the width of the output slot can be variably adjustable or adjusted in a simple manner.

For example, the first adjusting device may be configured to move, for example to pivot, the entire long side wall of the container facing away from the support structure.

In this way, for example, the width of the output slot can be variably adjustable or adjusted in a simple manner.

The long side wall of the container facing the support structure (of the coater) ("inner side wall") may, for example, be divided into at least an upper portion and a lower portion, which may, for example, be motion-decoupled. The first adjusting device may be configured, for example, to move, for example to pivot, the entire long side wall of the container facing away from the support structure together with the upper portion of the long side wall of the container facing the support structure. In this way, for example, the width of the output slot can be variably adjustable or adjusted in a simple manner. The upper portion of the long side wall of the container facing the support structure can be attached to the support structure for this purpose, for example indirectly via the first adjusting device.

The long side wall of the container facing away from the support structure may, for example, be stiffened in a transverse direction (for example by means of one or more stiffening elements) with the upper portion of the long side wall of the container facing the support structure, for example in the longitudinal direction of the container at one position (for example a position in the container, for example a position between the longitudinal ends of the container) or at several positions in succession (for example in the container, for example between the longitudinal ends of the container), for example by means of a respective sheet which is optionally provided with a through hole for passing a particulate material distribution auger accommodated in the container. In this way, for example, a movement of the two long side walls at least in a respective lower portion thereof adjoining the output slot relative to each other can be carried out in a simple manner, so that the width of the output slot is variably adjustable in a simple manner. The one of the two long side walls that is located closer to the support structure in the direction orthogonal to the longitudinal direction of the support structure is referred to as the long side wall of the container facing the support structure of the coater. For example, the long side wall of the container facing away from the support structure may be connected to the upper portion of the long side wall of the container facing the support structure via the sheets.

For example, the coater may include an elongated wiping element. The wiping element may, for example, be attached to the lower portion of the long side wall of the container facing the support structure. The wiping element may, for example, have the shape of a T-profile and/or directly delimit/define the output slot on an (inner) side of the slot, for example with a leg of the T-profile. The wiping element may, for example, at least co-form the long side wall of the container facing the support structure (for example the lower portion thereof). The wiping element may, for example, be part of the long side wall of the container facing the support structure. The lower portion of the long side wall of the container facing the support structure may, for example, be at least co-formed, for example formed by the wiping element. This may, for example, simplify a structure of the coater and/or allow the particulate material to be reliably applied to a/the construction field.

The wiping element may be formed, for example, as an oscillating blade. The oscillating blade may, for example, be excitable by an oscillating drive attached to the support structure. The oscillating blade may, for example, be excitable linearly in the direction parallel to the construction field. The oscillating drive may, for example, comprise an eccentric mechanism. The oscillating drive may for example comprise a (for example electric) motor, which may for example be configured to drive the eccentric mechanism. The oscillating drive may, for example, be connected via 5 or more engagement/connection points (for example contact points, for example bearing points) to the lower portion of the long side wall of the container facing the support structure. As a result, for example, an oscillation frequency of the oscillating blade may be increased, which may increase a coating speed of the coater. Furthermore, for example, the particulate material may be reliably applied to a/the construction field.

For example, the coater may include a second adjusting device by which an angle of the wiping element with respect to a/the construction field (for example with respect to a coating plane defined by the construction field) is adjustable, for example in a range of less than or equal to 3°, for example less than or equal to 2°, for example less than or equal to 1°. The coater may, for example, comprise a bearing block that is linearly movable across a construction field and to which the support structure is pivotally attached. The second adjusting device may, for example, be configured to pivot the support structure relative to the bearing block to thereby adjust the angle of the wiping element. The second adjusting device may, for example comprise (at least) a (for example electric) motor which in turn may, for example, be connected to a controller or may be controlled thereby.

By attaching the wiping element to the (other) side wall, which is not moved for the purpose of adjusting the slot width, the adjustment of the slot width can be carried out independent of/unrelated to a position and/or a work angle of the wiping element.

For example, the coater may have an elongated projection element attached to a lower portion of the long side wall of the container facing away from the support structure and having a projection extending in the longitudinal direction of the output slot and projecting toward the long side wall of the container facing the support structure. A lower portion of the elongated projection element may, for example, directly delimit or define a first side of the output slot. The projection may, for example, overlap the output slot with a vertical distance in the horizontal direction, for example by overlapping a leg of the optional T-profile. For example, the projection may be arranged in extension of the lower end of the long side wall of the container facing away from the support structure. For example, a portion of the elongated projection element may be stepped back below the projection that directly delimits/defines a first side of the output slot. For example, the elongated projection element may comprise a stepped-back portion disposed below the projection and directly delimiting/defining a first side of the output slot. For example, the elongated projection element may be configured to be exchangeable. For example, a plurality of elongated projection elements may be provided, the respective projection and/or respective stepped-back portion (for example respective back-stepping) of which is formed and/or dimensioned differently. The elongated projection element may be provided independently of the first adjusting device, for example, and/or may be provided independently of the two long side walls being movable relative to each other at least in a respective lower portion thereof adjoining the output slot. The elongated projection element may be provided, for example, on a coater. The projection may, for example, have an outer surface facing the long side wall facing the support structure and/or the inner cavity. This outer surface may, for example, be configured to be planar and/or may be arranged at an angle or inclined, in particular inclined with respect to the horizontal, for example also with respect to the vertical, and/or may be arranged in extension of the inner wall of the outer side wall or may co-form the latter. The projection may, for example, have an angular shape (for example, a quadrangular shape or a triangular shape) in a cross-section (for example, in a cross-section orthogonal to a longitudinal axis of the projection element).

For example, a channel structure/labyrinth structure may be provided by the elongated projection element, which structure opens into the output slot and by means of which a flow/trickle behavior of the particulate material can be specified/influenced, for example a petering out of particulate material in a parking position of the coater. By providing several projection elements, a suitable projection element can be selected for a specific particulate material and can be attached to the coater, so that the range of application of the coater is large without having to accept restrictions or while ensuring a suitable trickling behavior for the particulate material to be applied in each case.

For example, the upper portion and the lower portion of the long side wall of the container facing the support structure may overlap in the vertical direction. For example, the upper portion and the lower portion may be arranged in the overlapping region with horizontal distance/tolerance. The upper portion of the long side wall of the container facing the support structure may, for example, be closer in the overlapping region to the long side wall of the container facing away from the support structure (for example, than the lower portion of the long side wall of the container facing the support structure). For example, the upper portion of the long side wall of the container facing the support structure may be further away from the support structure of the coater in the overlapping region (for example, than the lower portion of the long side wall of the container facing the support structure). The lower end of the upper portion may, for example, be configured to be angled, for example angled inwardly towards the inner cavity, that is, away from the lower portion.

The upper portion of the long side wall of the container facing the support structure may, for example, be pivotally connected to the support structure (for example, a central or lower portion of the upper portion), for example, together with the outer side wall. The pivotable connection of the upper portion to the support structure may, for example, be configured to be releasable and/or unlockable and lockable. The pivotable connection of the upper portion to the support structure may be arranged, for example, in the vertical direction below a position at which the container (in particular an upper portion of the outer side wall and/or an upper part of the upper portion of the inner side wall) is connected to the first adjusting device.

The first adjusting device may comprise, for example, one or more (for example, three or more, for example, four, for example, five, for example, six, for example, seven) eccentric mechanisms associated with the container, for example, a plurality of eccentric mechanisms arranged in series in the longitudinal direction of the container, for example, eccentric mechanisms separately driven/drivable by a respective motor. The plurality of eccentric mechanisms may be arranged, for example, in succession in the longitudinal direction of the container. Each of the one or more eccentric mechanisms may, for example, be drivable or driven by a separate motor. In this way, for example, the width of the output slot can be variable or can be varied in the longitudinal direction of the slot in a simple manner. The one or more eccentric mechanisms may, for example, realize the pivoting movement, with pivotable mounting of, for example, at least the lower portion of the outer side wall. Alternatively, the one or more eccentric mechanisms may, for example, cause a linear motion of, for example, at least the lower portion of the outer side wall.

As an alternative to the eccentric mechanisms described above, one or more lift/linear drive mechanisms or one or more screw (spindle) mechanisms may be applied or used, for example, which, as described above for the one or more eccentric mechanisms, are connected to the container and/or arranged (for example, one after the other in the longitudinal direction of the container) and/or driven/drivable (for example, with a respective motor separately), and/or with which the effects described above for the eccentric mechanisms can be achieved, for example.

The one or more eccentric mechanisms (or the alternative mechanisms) may, for example, be connected with the container (for example, with the upper portion of the long side wall of the container facing the support structure and/or with the long side wall of the container facing away from the support structure, for example, with (at least) the lower portion thereof) via a longitudinal rod arranged parallel to the longitudinal direction of the container, wherein the container (for example the upper portion of the long side wall thereof facing the support structure and/or the long side wall thereof facing away from the support structure, for example (at least) the lower portion thereof) may for example be rotatably connected to the longitudinal rod and the one or more eccentric mechanisms may for example act substantially perpendicularly to the longitudinal axis of the longitudinal rod. In this way, for example, the width of the output slot can be variable or be varied in a simple manner in the longitudinal direction of the slot. In addition, this can advantageously allow the longitudinal rod to be used as a pivot axis to allow cleaning of the coater before/after a construction job by pivoting a part of the container (for example, the outer wall and the upper portion of the inner wall) away from the support structure around the longitudinal rod. In the pivoting position, the container (for example, the outer wall and/or the upper portion of the inner wall) may in this context be held, for example, by one or more gas springs.

The first adjusting device is configured, for example, to selectively move the two long side walls relative to each other at least in a respective lower portion thereof adjoining the output slot such that the width of the output slot varies in the longitudinal direction of the slot, for example with a difference/variance of up to at least 1 mm, for example up to at least 1.5 mm, for example up to at least 2 mm, for example up to at least 2.5 mm, for example up to at least 3 mm. For example, the width of the output slot in the longitudinal direction of the slot can be varied such that, for example, a slot width of 1.5 mm is adjusted at a first longitudinal end of the output slot, a slot width of 2.0 mm is adjusted at the center of the output slot as viewed in the longitudinal direction of the output slot, and a slot width of 2.5 mm is adjusted at a second longitudinal end of the output slot (or vice versa). Alternatively, for example, the width of the output slot can be varied in the longitudinal direction of the slot such that, for example, a slot width of 1.5 mm is adjusted at a first longitudinal end of the output slot, a slot width of 2.5 mm is adjusted at the center of the output slot as viewed in the longitudinal direction of the output slot, and a slot width of 1.5 mm is adjusted at a second longitudinal end of the output slot. Alternatively, for example, the width of the output slot can be varied in the longitudinal direction of the slot in such a way that, for example, a slot width of 2.5 mm is adjusted at a first longitudinal end of the output slot, a slot width of 1.5 mm is adjusted at the center of the output slot as viewed in the longitudinal direction of the output slot, and a slot width of 2.5 mm is adjusted at a second longitudinal end of the output slot.

In order to selectively move the two long side walls relative to each other at least in a respective lower portion thereof adjoining the output slot in such a way that the width of the output slot varies in the longitudinal direction of the slot, for example, the first adjusting device may comprise a plurality (for example, two or more, for example, three or more, for example, four or more, for example, five or more) of adjustment mechanisms and/or movement mechanisms connected to the container, for example, arranged one after the other in the longitudinal direction of the container (or in the longitudinal direction of the coater) and/or which are separately driven or drivable, for example, by a respective motor. The adjustment mechanisms and/or movement mechanisms may, for example, comprise eccentric mechanisms (for example, the eccentric mechanisms described above) and/or lift/linear drive mechanisms and/or screw (spindle) mechanisms or may be co-formed or formed by these. For example, the (plurality of) adjustment mechanisms and/or movement mechanisms may realize the pivoting motion, for example in the case of pivotal mounting of, for example, at least the lower portion of the outer side wall. Alternatively, the (plurality of) adjustment mechanisms and/or movement mechanisms may cause, for example, linear movement of, for example, at least the lower portion of the outer side wall.

By means of an output slot, the width of which varies in the longitudinal direction of the slot, it is possible, for example, to apply particulate material to a/the construction field in a particularly uniform/homogeneous manner. Thereby, for example, successive particulate material layers with uniform thicknesses can be applied reliably to the construction field over the entire surface/in a continuous way, whereby, for example, a quality of the components produced in 3D printing can be improved and a number of components with insufficient component quality can be reduced. In addition, for example, any tolerances or warpage that may occur can be compensated for.

For example, the first adjusting device may be configured to adjust the width of the output slot by a maximum of 5 mm and at least 1 mm, for example by a maximum of 4 mm and at least 2 mm. For example, the first adjusting device may be configured to adjust the width of the output slot by a maximum of 5 mm, for example by a maximum of 4 mm, for example by a maximum of 3 mm, for example by a maximum of 2 mm. The first adjusting device may be configured, for example, to adjust the width of the output slot by at least 1 mm, for example by at least 1.5 mm, for example by at least 2 mm. The coater may, for example, be configured as a unidirectional coater.

The coater and/or the 3D printer may, for example, comprise a control device. The control device may be configured, for example, to control the first adjusting device (for example, the one or more eccentric mechanisms, for example, the one or more motors by means of which a respective eccentric mechanism is drivable or driven) so that the two long side walls are moved relative to each other in an automated/automatic manner at least in a respective lower portion thereof adjoining the output slot, for example, depending on a particulate material used. The control device may be arranged, for example, to control the second adjusting device such that the angle of the wiping element relative to a/the construction field is adjusted in an automated/automatic manner, for example depending on a particulate material used. The control device may be configured, for example, to perform the above-described movements (for example relative movements) in an automated/automatic manner, for example depending on a particulate material used. This may, for example, improve a reproducibility of the particulate material layer applied to a/the construction field, whereby a 3D printing result may be improved.

According to an aspect of the invention, a 3D printer may comprise a coater configured as described above. For example, the 3D printer may comprise a print head for selectively dispensing a treatment agent, for example onto a layer of loose particulate material previously applied by means of the coater. The print head may, for example, be part of a printing device, i.e., the 3D printer may, for example, comprise a printing device having a/the print head.

According to an aspect of the invention, the coater described above may be used to apply particulate material in layers. For example, the particulate material may be selected from sand particles, for example foundry sand, and/or salt particles, for example for use in casting, and/or metal particles. It is understood that one or more additives may be added to the particulate material and/or the particulate material may further comprise a binder component.

According to an aspect of the invention, the 3D printer described above may be used to produce a casting mold and/or a casting core in layers. For example, the casting mold and/or casting core may be produced using binder jetting.

Exemplary but non-limiting embodiments of the invention are shown in the Figures and are explained in more detail below.

In the following detailed description, reference is made to the enclosed Figures which are incorporated therein and in which specific embodiments are shown by way of illustration, according to which the invention can be performed. In this respect, the terms indicating a direction, such as "up", "down", "front", "rear", etc. are used with reference to the orientation in the described Figure(s). As components of embodiments may be positioned in a number of different orientations, the terminology indicating the different directions serves for illustration and shall not be restrictive in any way.

It shall be understood that other embodiments may be used and structural or logical changes may be made without deviating from the scope of protection of this invention. It goes without saying that the features of the various exemplary embodiments described herein may be combined unless specified otherwise. Thus, the following description should not be understood in a restrictive sense and the scope of protection of this invention shall be defined by the attached claims.

In this description, terms such as "connected", "attached" and "coupled" may be used to describe both a direct and indirect connection, a direct or indirect attachment and a direct or indirect coupling.

In the Figures, identical or similar elements are provided with identical reference numbers where appropriate.

Figure 1:
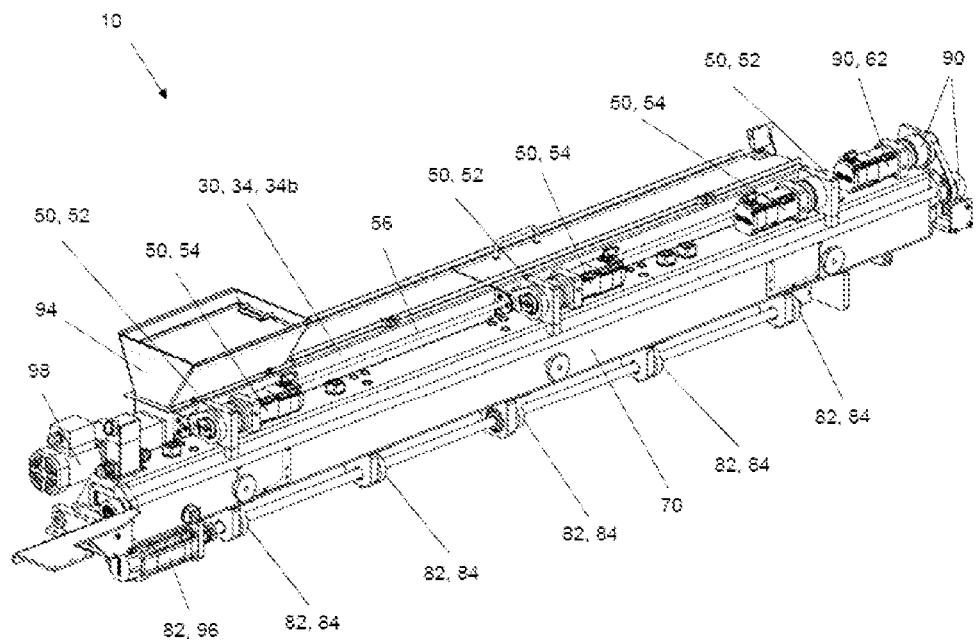
FIG. 1 shows a first perspective view of a coater for a 3D printer according to a first embodiment of the invention.
Figure 2:
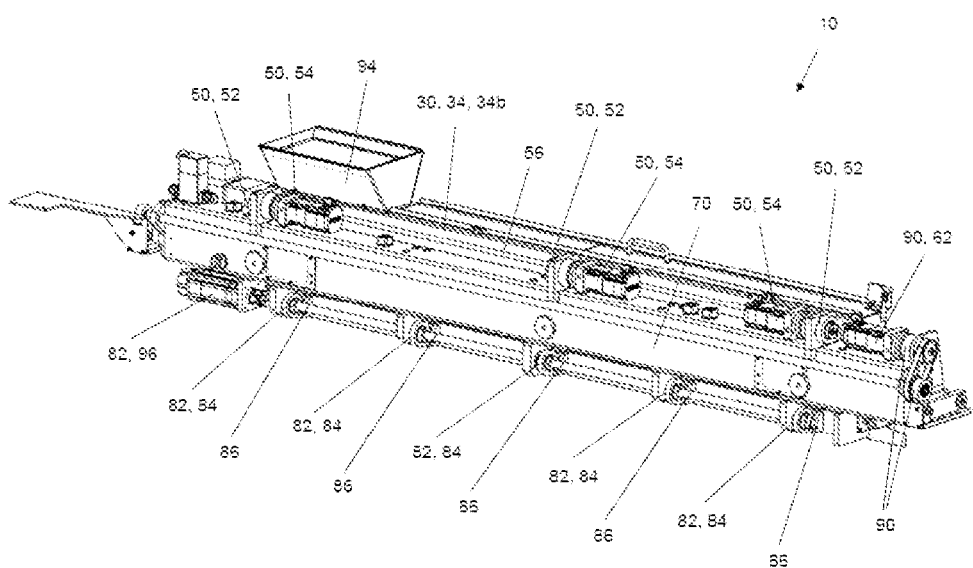
FIG. 2 shows a second perspective view of the coater for a 3D printer according to the first embodiment of the invention.
Figure 3:
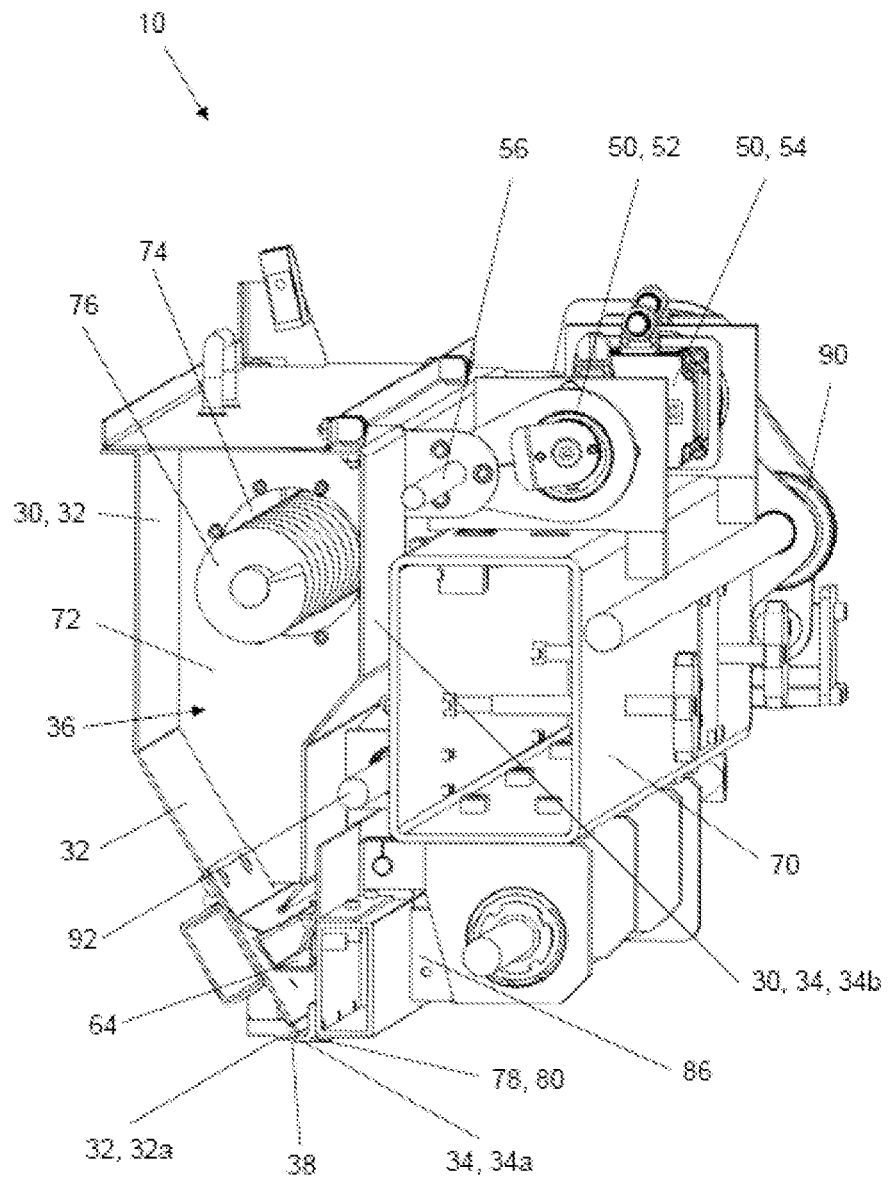
FIG. 3 shows a first perspective cross-sectional view of the coater for a 3D printer according to the first embodiment of the invention.
Figure 4:
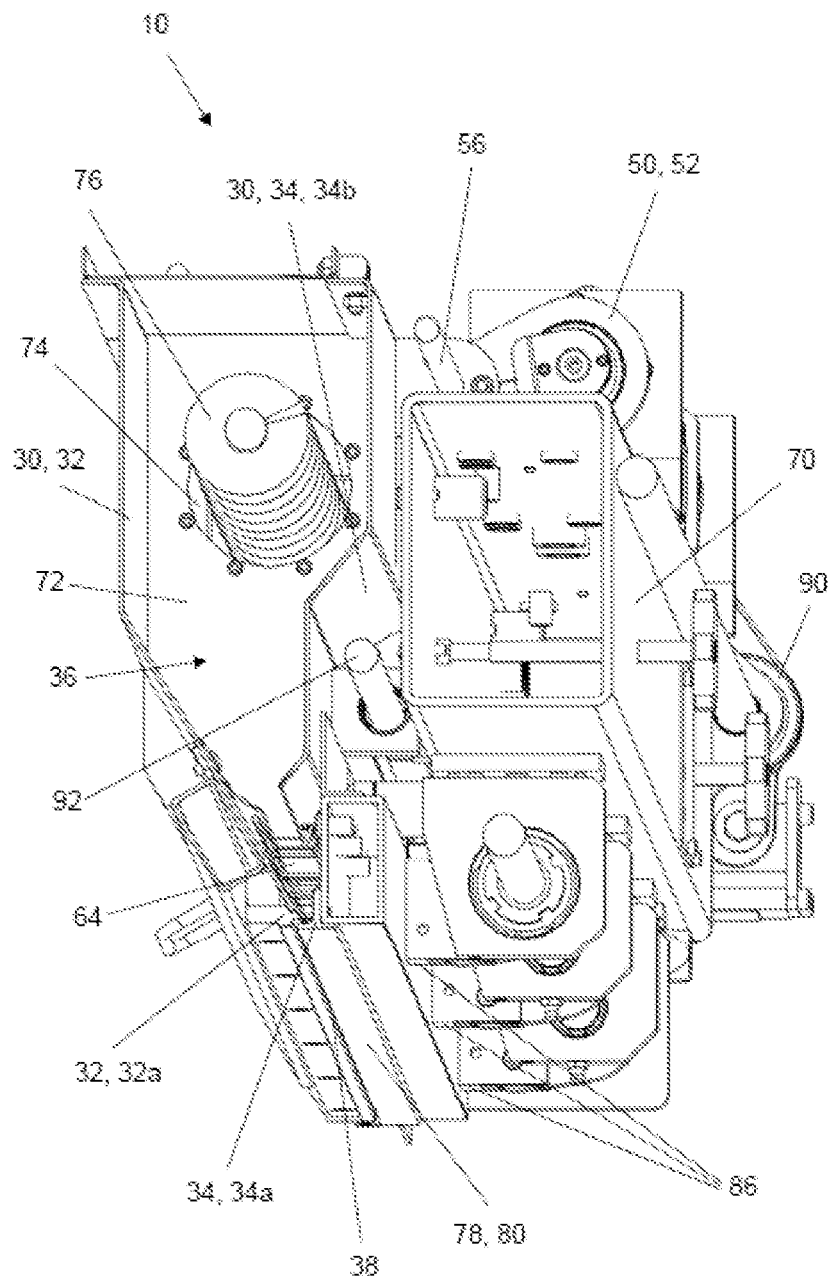
FIG. 4 shows a second perspective cross-sectional view of the coater for a 3D printer according to the first embodiment of the invention.
Figure 5:
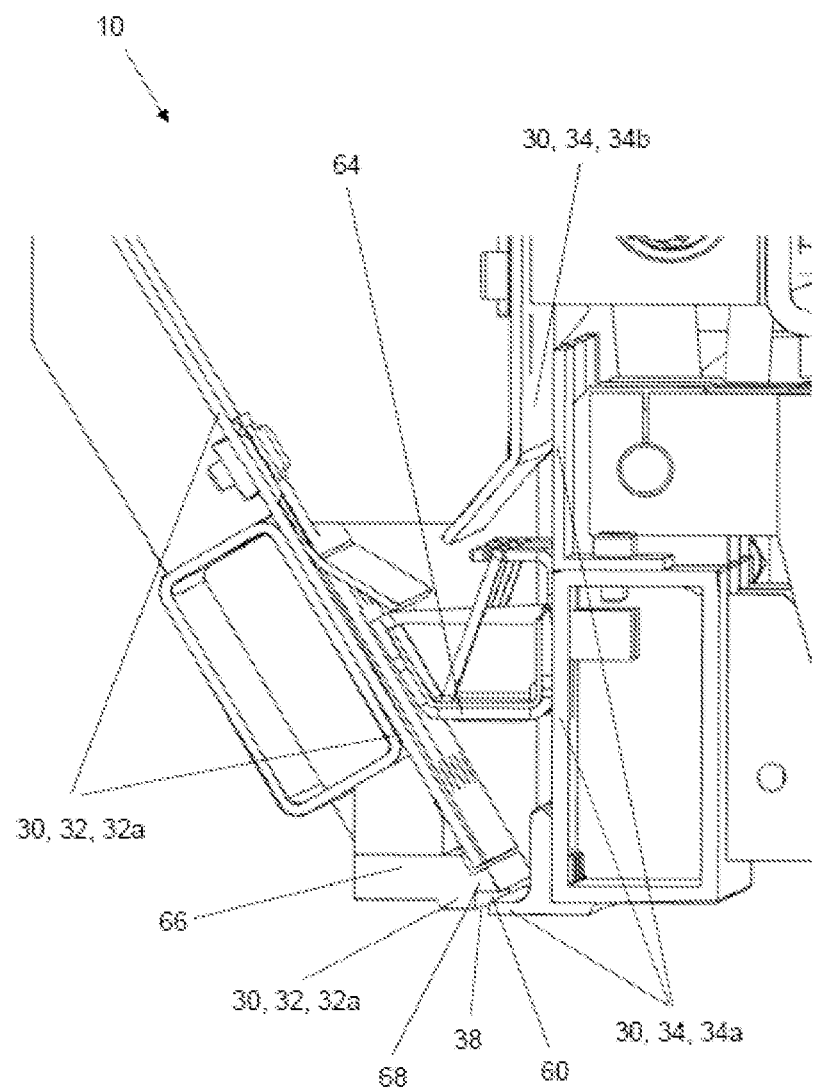
FIG. 5 shows a third perspective cross-sectional view of the coater for a 3D printer according to the first embodiment of the invention.
Figure 6:
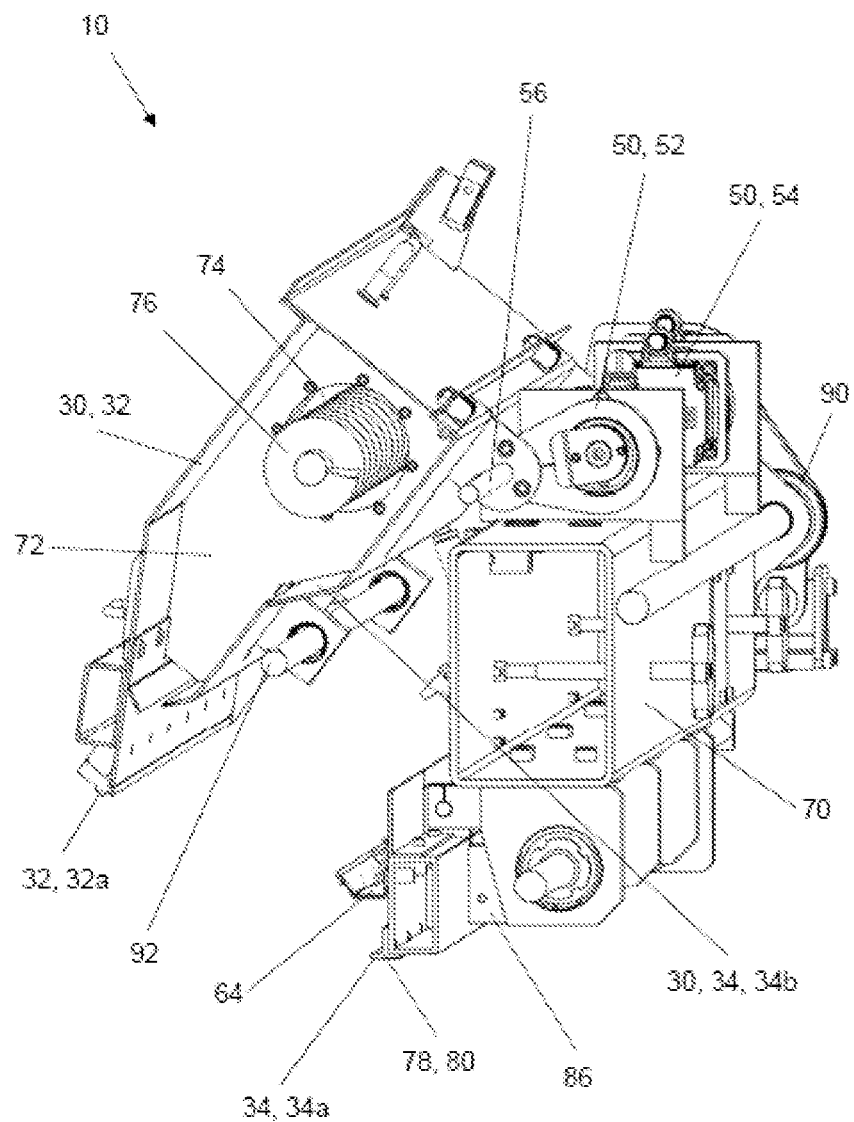
FIG. 6 shows a fourth cross-sectional perspective view of the coater for a 3D printer according to the first embodiment of the invention.
Figure 7:
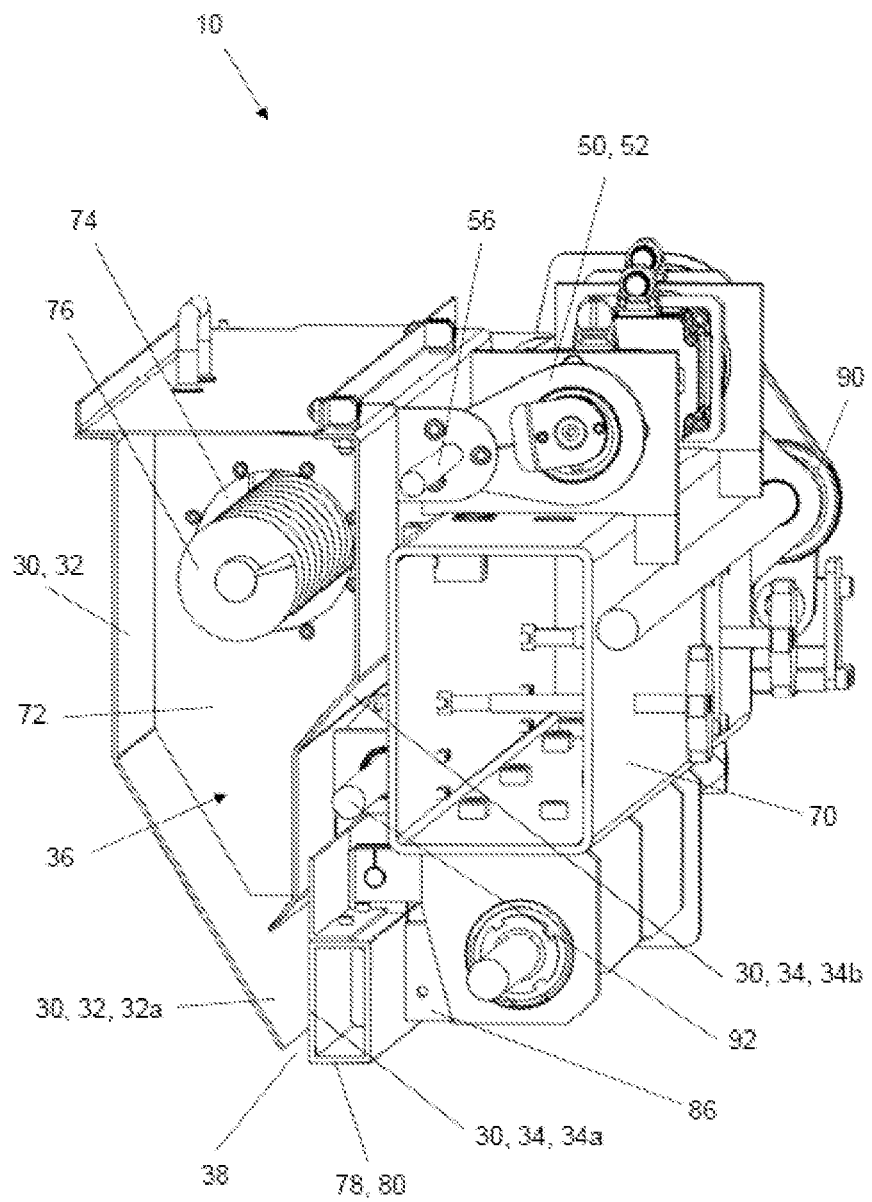
FIG. 7 shows a perspective cross-sectional view of a coater for a 3D printer according to a second embodiment of the invention.

FIGS. 1 to 6 show a coater for a 3D printer according to a first embodiment of the invention. FIGS. 1 and 2 show perspective views of the coater according to the first embodiment. FIGS. 3 to 6 show perspective cross-sectional views (or cut perspective views) of the coater according to the first embodiment, in which the section plane is orthogonal to the longitudinal axis of the coater (i.e., in which the coater is cut orthogonally to its longitudinal axis). FIGS. 3 and 4 show the same sections from different perspectives. FIG. 5 shows the same section as FIG. 3, but the perspective is different and a lower portion of the coater is shown in FIG. 5. FIGS. 1 to 5 show the coater in a particulate material application state (i.e. in a state in which the coater is usable for applying particulate material, for example is movable over a construction field). FIG. 6 shows the coater in an unfolded state (i.e. in a state in which the coater is unfolded and easily accessible for maintenance and/or cleaning, for example). FIG. 7 shows a coater for a 3D printer according to a second embodiment of the invention. FIG. 7 shows a perspective cross-sectional view (or cut perspective view) of the coater according to the second embodiment, in which the section plane is orthogonal to the longitudinal axis of the coater (i.e., in which the coater is cut orthogonal to its longitudinal axis).

As shown in FIGS. 1 to 7, a coater 10 for a 3D printer has an elongated container 30 having two opposing long side walls 32, 34 between which is formed an inner cavity 36 for receiving particulate material opening into an elongated output slot 38 for discharging the particulate material from the container 30 onto a construction area, and a first adjusting device 50 configured to move the two long side walls 32, 34 relative to each other at least in a respective lower portion 32a, 34a thereof adjoining the output slot 38 to thereby variably adjust the width of the output slot 38. For example, the container 30 may define or form the inner cavity 36. The output slot 38 may be located, for example, at a lower end of the container 30. The output slot 38 may be formed or defined, for example, by the two lower ends (for example, the two lower edges) of the two long side walls 32, 34.

The first adjusting device 50 may be arranged, for example, to pivot the two long side walls 32, 34 relative to each other at least in a respective lower portion 32a, 34a thereof adjoining the output slot 38 to thereby variably adjust the width of the output slot 38. The pivoting movement may, for example, be about a pivot axis 92. To this end, for example, at least the lower portion 32a, 34a of one of the two long side walls 32, 34 may be pivotable or pivoted about the pivot axis 92. For example, the pivot axis 92 may be located outside the container 30, for example adjacent to one of the two long side walls 32, 34 of the container.

As shown in FIGS. 1-7, the coater 10 may comprise, for example, an elongated support structure 70 to which the container 30 (for example, (at least) a part of the container 30) and the first adjusting device 50 are attached. The first adjusting device 50 may, for example, be attached (directly) to a top side of the support structure 70. The container 30 may, for example, with its long side wall 34 facing the support structure 70, for example at an upper portion 34b thereof, on the one hand be (indirectly) connected to the support structure 70 via the first adjusting device 50, and on the other hand be (directly) pivotally connected to the support structure 70, for example below the connection to the first adjusting device 50.

The first adjusting device 50 may be configured, for example, to move, for example to pivot, the long side wall 32 which faces away from the support structure 70 of the coater 10, in at least the lower portion 32a thereof adjoining the output slot 38, for example about the pivot axis 92.

For example, the first adjusting device 50 may be configured to move, for example pivot, the entire long side wall 32 of the container 30 facing away from the support structure 70, for example about the pivot axis 92.

As shown in FIGS. 3 to 7, the long side wall 34 of the container 30 facing the support structure 70 may be divided into at least an upper portion 34b and a lower portion 34a, which are motion-decoupled. The lower portion 34a may, for example, comprise or be formed by a plurality of (structural) parts (for example, two or three or more (structural) parts). Alternatively, the lower portion 34a may, for example, be formed by one (structural) part. For example, the pivot axis 92 may be disposed adjacent to the long side wall 34 of the container 30 facing the support structure 70, for example the upper portion 34b thereof.

For example, the first adjusting device 50 may be configured to move, for example pivot, the entire long side wall 32 of the container 30 facing away from the support structure 70 together with the upper portion 34b of the long side wall 34 of the container 30 facing the support structure 70, for example about the pivot axis 92.

As shown in FIGS. 3, 4, 6 and 7, for example, the long side wall 32 of the container 30 facing away from the support structure 70 may be stiffened in a transverse direction with the upper portion 34b of the long side wall 34 of the container 30 facing the support structure 70, for example, in the longitudinal direction of the container 30 at one position (for example, at the center of the container 30) or at a plurality of positions in succession, for example, by means of a respective sheet 72 optionally provided with a through hole 74 for passing therethrough a particulate material distribution auger 76 accommodated in the container 30.

For example, the coater may include a particulate material distribution auger 76. For example, the particulate material distribution auger 76 may be disposed in the container 30, for example in the inner cavity 36. For example, the particulate material distribution auger 76 may be configured to uniformly distribute a particulate material in the container 30 (for example in the inner cavity 36 thereof). For example, the particulate material may be supplied to the inner cavity 36 via a particulate material supply opening (for example, a particulate material supply hopper 94). The particulate material supply opening or particulate material supply hopper 94 may be located, for example, adjacent to or at a longitudinal end of the coater 10, for example adjacent to or at a longitudinal end of the container 30. The particulate material distribution auger 76 may be drivable, for example, by an (electric) motor 98.

As shown in FIGS. 3 to 7, the coater may have, for example, an elongated wiping element 78. For example, the wiping element 78 may be attached to a/the lower portion 34a of the long side wall 34 of the container 30 facing the support structure 70 and/or may have the shape of a T-profile, for example.

For example, as shown in FIGS. 3 to 6, the wiping element 78 may co-form the lower portion 34a of the long side wall 34 of the container 30 facing the support structure 70. For example, a lower end (for example, a lower edge) of the long side wall 34 of the container 30 facing the support structure 70 (for example, of the lower portion 34a thereof) may be at least co-formed, for example formed, by the wiping element 78.

As shown in FIG. 7, for example, the wiping element 78 and at least the lower portion 34a of the long side wall 34 of the container 30 facing the support structure 70 may be integrally formed, for example, by an oblong or elongated hollow profile which is, for example, configured to be rectangular in cross-section.

The wiping element 78 may, for example, optionally be formed as an oscillating blade 80 which is, for example, excitable by an oscillating drive 82 attached to the support structure 70, for example linearly in a direction parallel to the construction field. The oscillating drive 82 may, for example, comprise an eccentric mechanism 84 and/or be connected with the lower portion 34a of the long side wall 34 of the container 30 facing the support structure 70 via 5 or more engagement points 86. The oscillating drive 82 may, for example, comprise an (electric) motor 96.

For example, the coater 10 may have a second adjusting device 90 by which an angle of the wiping element 78 relative to a construction field is adjustable, for example in a range of less than or equal to 3°, for example less than or equal to 2°, for example less than or equal to 1°. The coater 10 may have, for example, a bearing block that is linearly movable across a construction field and to which the support structure 70 is pivotally attached. The second adjusting device 90 may be configured, for example, to pivot the support structure 70 relative to the bearing block to hereby adjust the angle of the wiping element 78. The second adjusting device 90 may, for example, have an (electric) motor 62.

For example, as shown in FIG. 5, the coater may comprise an elongated projection element 66 attached to a lower portion 32a of the long side wall 32 of the container 30 facing away from the support structure 70 and having a projection 68 extending in the longitudinal direction of the output slot 38 and projecting toward the long side wall 34 facing the support structure 70. A lower portion of the elongated projection element 66 may, for example, directly delimit/define a first (longitudinal) side of the output slot 38. The projection 68 may, for example, overlap the output slot 38 with a vertical distance in the horizontal direction, for example by overlapping a leg of the optional T-profile of the wiping element 78. The projection 68 (for example, a surface thereof) may, for example, be disposed in extension of the lower end of the long side wall 32 facing away from the support structure 70. For example, a portion 60 of the elongated projection element 66 arranged below the projection 68 and directly delimiting/defining a first side of the output slot 38 may be stepped back. For example, the elongated projection element 66 may be configured to be exchangeable. For example, a plurality of different elongated projection elements 66 may be provided, the respective projection 68 and/or stepped-back portion 60 of which is formed/dimensioned differently. For example, a different dimensioning/formation of the projection 68 and/or the stepped-back portion 60 may influence (for example, adjust and/or control) the vertical distance and/or the horizontal overlap and/or a particulate material flow (for example, from the container to the construction field). The elongated projection element 66 and/or the projection 68 and/or the lower portion of the elongated projection element 66 may, for example, at least co-form the long side wall 32 of the container 30 facing away from the support structure 70, for example a lower portion 32a thereof adjoining the output slot 38, and/or may, for example, be part of the long side wall 32 of the container 30 facing away from the support structure 70. The lower portion 32a of the long side wall 32 of the container 30 facing away from the support structure 70 may, for example, be at least co-formed, for example formed, by the elongated projection element 66 and/or the projection 68 and/or the lower portion of the elongated projection element 66. The projection 68 may be formed, for example, such that an (upper) surface of the projection 68 facing and/or opposing the long side wall 34 facing the support structure 70 is arranged at an angle of greater than 0° (for example, greater than or equal to 10°, for example, greater than or equal to 20°, for example, greater than or equal to 30°, for example, greater than or equal to 40°, for example, greater than or equal to 50°, for example greater than or equal to 60°, for example greater than or equal to 70°, for example greater than or equal to) 80° and/or less than or equal to 90° (for example less than or equal to 80°, for example less than or equal to 70°, for example less than or equal to 60°, for example less than or equal to 50°, for example less than or equal to 40°, for example less than or equal to) 30° with respect to a horizontal plane (for example the construction field plane). The projection 68 may have, for example, an angular shape (for example, a quadrangular shape or a triangular shape) in a cross-section (for example, in a cross-section orthogonal to a longitudinal axis of the projection element 66).

For example, as shown in FIGS. 3, 4, 5, and 7, the upper portion 34b and the lower portion 34a of the long side wall 34 of the container 30 facing the support structure 70 may overlap in the vertical direction. The upper portion 34b and the lower portion 34a may be arranged in the overlapping region with, for example, horizontal distance/tolerance. The upper portion 34b of the long side wall 34 of the container 30 facing the support structure 70 may be closer in the overlapping region to the long side wall 32 of the container 30 facing away from the support structure 70, for example.

The upper portion 34b of the long side wall 34 of the container 30 facing the support structure 70 may, for example, be pivotally connected to the support structure 70, for example via the pivot axis 92. The pivotal connection of the upper portion 34b to the support structure 70 may be, for example, configured to be releasable and/or unlockable and lockable, to allow the coater 10 to be opened for cleaning thereof or, for this purpose, to release the connection to the pivot axis 92.

The pivotable connection of the upper portion 34b to the support structure 70 may be arranged, for example, in the vertical direction below a position at which the container 30 is connected to the first adjusting device 50.

The first adjusting device 50 may comprise, for example, one or more (for example, three or more) eccentric mechanisms 52 connected with the container 30. For example, the first adjusting device 50 may comprise a plurality (for example, three or more) of eccentric mechanisms 52 arranged in succession in the longitudinal direction of the container 30. The one or more eccentric mechanisms 52 may, for example, be separately drivable or driven by a respective (electric) motor 54. Thereby, for example, the first adjusting device 50 may be configured to selectively move, for example pivot, the two long side walls 32, 34 relative to each other at least in a respective lower portion 32a, 34a thereof adjoining the output slot 38 such that the width of the output slot 38 varies in the longitudinal direction of the slot.

As shown in FIGS. 1 and 2, the first adjusting device 50 may comprise, for example, three eccentric mechanisms 52 arranged in succession in the longitudinal direction of the container 30, connected with the container 30 and separately driven by a respective motor 54, which eccentric mechanisms 52 may be arranged, for example, on/at the support structure 70, for example an upper side thereof. The eccentric mechanisms 52 and/or the respective motors 54 may, for example, be adjustable/drivable or adjusted/driven such that the two long side walls 32, 34, at least in a respective lower portion 32a, 34a thereof adjoining the output slot 38, are selectively movable or moved relative to each other (for example, are pivotable or pivoted) such that the width of the output slot 38 is variable or varies in the longitudinal direction of the slot.

The one or more eccentric mechanisms 52 may, for example, be connected with the container 30 via a longitudinal rod 56 arranged parallel to the longitudinal direction of the container 30, wherein the container 30 is rotatably connected to the longitudinal rod 56 and the one or more eccentric mechanisms 52 act substantially perpendicular to the longitudinal axis of the longitudinal rod 56 for the purpose of adjusting the slot width.

For example, the longitudinal rod 56 may further be or act as a rotation axis or pivot axis for pivoting a part of the container 30 (for example, the long side wall 32 facing away from the support structure 70 and the upper portion 34b of the long side wall 34 facing the support structure) away from the support structure 70 upon release of the pivot axis 92. This allows, for example, a screen 64 (for example, particulate material screen 64) disposed in the container 30 to be easily accessible for maintenance and/or cleaning thereof.

The first adjusting device 50 may, for example, be configured to selectively move, for example pivot, the two long side walls 32, 34 relative to each other at least in a respective lower portion 32a, 34a thereof adjoining the output slot 38 such that the width of the output slot 38 varies in the longitudinal direction of the slot, for example with a difference/variance of up to at least 1 mm, for example up to at least 1.5 mm, for example up to at least 2 mm.

As shown, for example, in FIGS. 1 and 7, for example three eccentric mechanisms 52 may be arranged in succession in the longitudinal direction of the coater 10 (or in the longitudinal direction of the container 30) and may be connected to a part or portion of the container 30 via a/the longitudinal rod 56. The part or portion of the container 30 that is connected to the eccentric mechanisms 52 may, for example, be pivoted about a/the pivot axis 92 ("pivotable part or portion").

In the embodiment shown in FIG. 7, for example, the entire long sidewall 32 and the upper portion 34b of the long sidewall 34 are pivotable about the pivot axis 92 (and thus form the pivotable part or portion). A pivoting (of the pivotable part or portion) may, for example, move the lower portion 32a of the long side wall 32 adjoining the output slot 38 in a direction toward or in a direction away from the lower portion 34a of the long side wall 34 adjoining the output slot 38, thereby allowing to change or adjust the width of the output slot 38. For example, if the eccentric mechanism 52 located in the center of the coater 10 (or in the center of the container 30) is controlled in a way to push the longitudinal rod 56 away from it (to the left in FIG. 7), the width of the output slot 38 decreases in the center of the coater 10. If, for example, the eccentric mechanisms 52 arranged on the outside in the longitudinal direction of the coater 10 are simultaneously controlled in a way to pull the longitudinal rod 56 towards them (to the right in FIG. 7), the width of the output slot 38 increases at the two longitudinal ends of the coater 10. In this way, for example, an adjustment of the width of the output slot 38 can be realized, in which the width of the output slot 38 varies in the longitudinal direction of the slot in such a way that the width of the output slot 38 is greater at the two longitudinal ends of the output slot 38 than the width of the output slot 38 in the center of the output slot 38. The longitudinal rod 56 and/or the pivotable part or portion and/or the container 30 and/or the long sidewall 32 and/or the lower portion 32a of the long sidewall 32 and/or the long sidewall 34 and/or the upper portion 34b of the long sidewall 34 may, for example, comprise a material or consist or be made of a material that is (at least somewhat) deformable and/or bendable (for example, bendable and/or deformable material), for example in such a way that the above-described adjustments can be easily and reliably realized. By using, for example, four or more eccentric mechanisms 52, a "wavelike" or several times alternating adjustment of the width of the output slot 38 can be obtained, for example.

Alternatively or in addition to the eccentric mechanisms 52 described above, for example, mechanisms acting in a similar way or equivalent mechanisms (for example, adjustment mechanisms and/or movement mechanisms) may be employed or used, for example, lift/linear drive mechanisms and/or screw (spindle) mechanisms. It is understood that alternative embodiments are possible or may be used to transmit a force and/or motion from the eccentric mechanisms 52 (or the mechanisms alternative thereto) to the pivotable part or portion of the container 30; for example, the eccentric mechanisms 52 (or the mechanisms alternative thereto) may be in direct contact and/or connection with the pivotable part or portion of the container 30 (i.e., without the longitudinal rod 56).

The first adjusting device 50 may be configured, for example, to adjust the width of the output slot 38 by a maximum of 5 mm and at least 1 mm, for example, by a maximum of 4 mm and at least 2 mm. The coater 10 may be configured, for example, as a unidirectional coater 10.

For example, a 3D printer may comprise the above-described coater 10 and a print head for selectively dispensing a treatment agent onto a layer of loose particulate material applied by means of the coater 10 (for example, onto a construction field).

The above-described coater 10 may be used, for example, for applying particulate material in layers, which may be selected, for example, from sand particles, for example foundry sand, and/or salt particles, for example for use in casting, and/or metal particles.

The 3D printer described above may be used, for example, for layer-by-layer production of a casting mold and/or a casting core, for example by means of binder jetting.

The invention claimed is:
1. A coater for a 3D printer, comprising:
an elongated container having two opposing, long sidewalls between which an internal cavity for receiving particulate material is formed, which opens into an elongated output slot for outputting the particulate material from the container onto a construction field,
a first adjusting device configured to pivot the two long side walls relative to each other at least in a respective lower portion thereof adjoining the output slot to thereby variably adjust a width of the output slot.
2. The coater according to claim 1, further comprising an elongated support structure to which the container and the first adjusting device are attached, wherein one of the two long side walls faces away from the support structure and one of the two long sidewalls faces the support structure,
wherein the first adjusting device is configured to pivot the long side wall which faces away from the support structure of the coater in at least the lower portion thereof adjoining the output slot.

3. The coater according to claim 2, wherein
the first adjusting device is configured to pivot an entirety of the long side wall of the container facing away from the support structure.

4. The coater according to claim 2, wherein
the long side wall of the container facing the support structure is subdivided into at least an upper portion and a lower portion, which are motion-decoupled,
wherein the first adjusting device is configured to pivot the entire long side wall of the container facing away from the support structure, together with the upper portion of the long side wall of the container facing the support structure.

5. The coater according to claim 2, further comprising:
an elongated wiping element which is attached to a lower portion of the long side wall of the container facing the support structure.

6. The coater according to claim 4,
wherein the upper portion and the lower portion of the long side wall of the container facing the support structure overlap in a vertical direction.

7. The coater according to claim 4,
wherein the upper portion of the long side wall of the container facing the support structure is pivotally connected to the support structure.

8. The coater for a 3D printer according to claim 1,
wherein the first adjusting device is configured to selectively pivot the two long side walls relative to each other at least in a respective lower portion thereof adjoining the output slot in such a way that a width of the output slot varies in a longitudinal direction of the slot.

9. The coater for a 3D printer according to claim 1,
wherein the first adjusting device is configured to adjust the width of the output slot by a maximum of 5 mm and at least 1 mm and/or wherein the coater is configured as a unidirectional coater.

10. A 3D printer having the coater according to claim 1, further comprising
a print head for selectively outputting a treatment agent onto a layer of loose particulate material applied by means of the coater.

11. The coater according to claim 5, wherein the wiping element comprises an oscillating blade excitable by an oscillating drive attached to the support structure.

12. A coater for a 3D printer, comprising:
an elongated container having two opposing, long sidewalls between which an internal cavity for receiving particulate material is formed, which opens into an elongated output slot for outputting the particulate material from the container onto a construction field;
a first adjusting device configured to move the two long side walls relative to each other at least in a respective lower portion thereof adjoining the output slot to thereby variably adjust the width of the output slot;
an elongated support structure to which the container and the first adjusting device are attached,
wherein the first adjusting device is configured to move the long side wall which faces away from the support structure of the coater in at least the lower portion thereof adjoining the output slot,
wherein the long side wall of the container facing the support structure is subdivided into at least an upper portion and a lower portion, which are motion-decoupled,
wherein the first adjusting device is configured to move the entire long side wall of the container facing away from the support structure together with the upper portion of the long side wall of the container facing the support structure.

13. The coater of claim 12, wherein
the long side wall of the container facing away from the support structure is stiffened in a transverse direction with the upper portion of the long side wall of the container facing the support structure.

14. The coater of claim 12, wherein the long side wall of the container facing away from the support structure is stiffened in a transverse direction with the upper portion of the long side wall of the container facing the support structure in a longitudinal direction of the container at one position or at a plurality of positions in succession.

15. The coater of claim 14, wherein the long side wall of the container facing away from the support structure is stiffened by means of a respective sheet which is provided with a through hole for passing a particulate material distribution auger accommodated in the container.

16. A coater for a 3D printer, comprising: an elongated container having two opposing, long sidewalls between which an internal cavity for receiving particulate material is formed, which opens into an elongated output slot for outputting the particulate material from the container onto a construction field; a first adjusting device configured to move the two long side walls relative to each other at least in a respective lower portion thereof adjoining the output slot to thereby variably adjust the width of the output slot, wherein the first adjusting device comprises one or more eccentric mechanisms connected to the container, wherein the one or more eccentric mechanisms comprise a plurality of eccentric mechanisms arranged in succession in the longitudinal direction of the container, and wherein the plurality of eccentric mechanisms are driven separately by a respective motor.

17. The coater according to claim 16,
wherein the one or more eccentric mechanisms are connected with the container via a longitudinal rod arranged parallel to the longitudinal direction of the container,
wherein the container is rotatably connected to the longitudinal rod and the one or more eccentric mechanisms act substantially perpendicular to the longitudinal axis of the longitudinal rod.

* * * * *